United States Patent [19]

Benthake

[11] 4,072,067
[45] Feb. 7, 1978

[54] PLANETARY GEARING WITH CLOSED HOUSING

[75] Inventor: Heinrich Benthake, Mulheim (Ruhr), Germany

[73] Assignee: WGW Westdeutsche Getriebe- und Kupplungswerke GmbH, Bochum, Germany

[21] Appl. No.: 679,678

[22] Filed: Apr. 23, 1976

[30] Foreign Application Priority Data

Apr. 24, 1975 Germany .............................. 2518113

[51] Int. Cl.² .............................................. F16H 57/08
[52] U.S. Cl. ......................................... 74/789; 74/467
[58] Field of Search ................................. 74/789, 792

[56] References Cited
U.S. PATENT DOCUMENTS 489,112  1/1893  Wright ................................... 74/789

Primary Examiner—Stephen C. Bentley
Attorney, Agent, or Firm—Herbert L. Lerner

[57] ABSTRACT

Planetary gearing comprising a stationary support, an outer housing rotatably suspended from the support, the housing including internal gear teeth and being adapted to contain a lubricant, the stationary support including an inner portion extending within the housing, a driving gear rotatably mounted within the inner stationary support portion and housing, satellite gear means rotatably mounted on the inner stationary support portion and coupling the driving gear with the housing internal gear teeth, a first bearing rotatably coupling the housing with the stationary support, the first bearing being enclosed within the housing above the level of lubricant to be contained in the housing, and a second bearing mounted on the inner stationary support enclosed within the housing.

4 Claims, 1 Drawing Figure

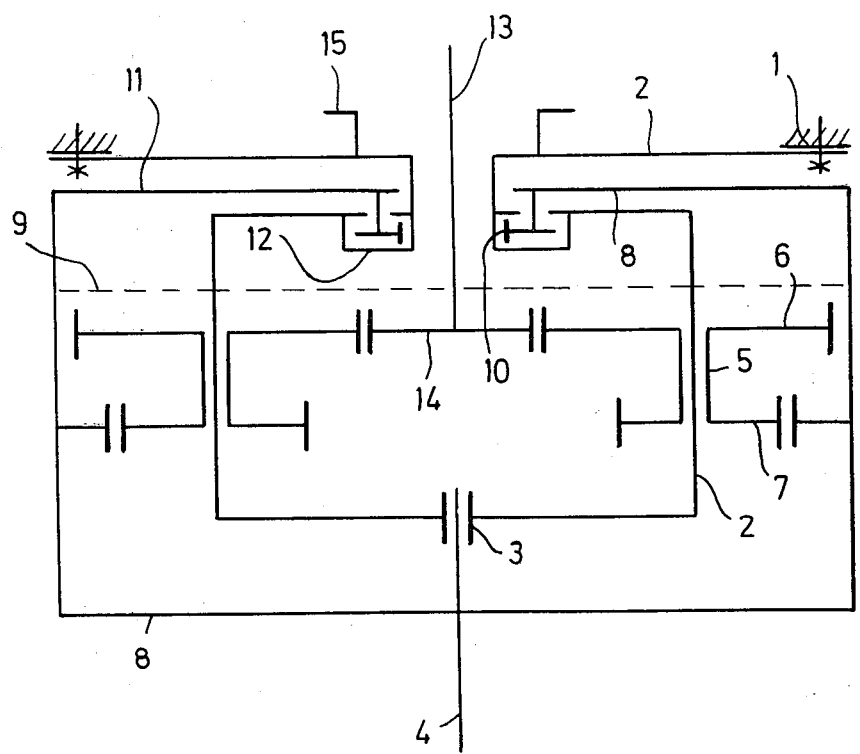

PLANETARY GEARING WITH CLOSED HOUSING

BACKGROUND OF THE INVENTION

1. Field of the Invention

The invention relates to planetary gearing in which the output is transmitted via a revolving outer housing which functions as an internal gear and is partially filled with a lubricant. In particular, the satellite gears are supported by the stationary part of the gearing, and the revolving and the stationary parts of the gearing are held in their relative position by two bearings.

2. Description of the Prior Art

Planetary gearing of the above-identified type has been used in engineering applications, such as for example, in simple wheel bearing transmissions. In such wheel bearing transmissions, the sun gear is driven by the axle and the output is transmitted by the revolving outer housing which is bolted to the rim of the wheel. A problem with this type of gearing is that the transmission lubricant may leak or escape, which would prevent its use in sensitive applications such as in chemical processes.

SUMMARY OF THE INVENTION

It is therefore an object of the invention of the instant application to provide planetary gearing in which the lubricant within the transmission is prevented from escaping. This permits the use of such gearing in applications such as in the chemical industry, where the escape of oil, even in traces, must be avoided in a reliable manner.

With the foregoing and other objects in view, there is provided in accordance with the invention, planetary gearing comprising a stationary support, an outer housing rotatably suspended from the support, the housing including internal gear teeth and being adapted to contain a lubricant, the stationary support including an innerportion extending within the housing, a driving gear rotatably mounted within the inner stationary support portion and housing, satellite gear means rotatably mounted on the inner stationary support portion and coupling the driving gear with the housing internal gear teeth, a first bearing rotatably coupling the housing with the stationary support, the first gearing being enclosed within the housing above the level of lubricant to be contained in the housing, and a second bearing mounted on the inner stationary support enclosed within the housing.

In accordance with another feature of the invention, the planetary gearing housing includes output coupling means rotatably mounted in the second bearing.

In accordance with a further feature of the invention, the satellite gear means includes a plurality of satellite gears.

In accordance with an additional feature of the invention, the outer housing completely encloses the driving and satellite gears and bearings and seals in the lubricant. In this manner the interior oil containing bearing is completely closed off from the outside by the internal gear and the contact point of the revolving internal gear with the stationary satellite carrier is positioned above the inner lubricant level. As a result, there is no possible path for the lubricant content to escape from the closed-off housing, which forms an encapsulation or seal for the inner elements.

In accordance with still another feature of the invention, the stationary support includes a mounting flange on the upper end of the housing. In this manner, a surface is provided on the upper side of the transmission, which covers the top of the transmission and also permits a simplified mounting of the transmission at the cover of a tank or a similar part without the need to provide additional mounting means for the planetary gearing.

In accordance with a concomitant feature of the invention, the first bearing is mounted within a well having walls forming a lubricant retaining labyrinth. This ensures that no amount of the bearing lubricant can escape from the area of the bearing. Due to the force of gravity as well as the effect of centrifugal force in the labyrinth, it is impossible for even the smallest amounts of lubricant of the upper housing bearing to escape from the enclosed area of the bearing. In this manner, an absolutely oil- and lubricant-tight encapsulation of the transmission is achieved.

In accordance with an added feature of the invention, the plurality of satellite gears includes a pair of double satellite gears each having a larger diameter gear half meshing with the driving gear and a smaller diameter gear half rotatable with the larger diameter gear half and meshing with the internal gear teeth. This configuration makes it possible to achieve a very large step-down ratio in a small volume, so that an oil-tight as well as a particularly compact transmission design having a large-step-down ratio is obtained.

Other features which are considered as characteristic for the invention are set forth in the appended claims.

Although the invention is illustrated and described herein as embodied in planetary gearing, it is nevertheless not intended to be limited to the details shown, since various modifications maybe made therein without departing from the spirit of the invention and within the scope and range of equivalents of the claims.

The invention, however, together with additional objects and advantages thereof will be best understood from the following descriptions when read in connection with the accompanying drawing.

BRIEF DESCRIPTION OF THE DRAWING

The single FIGURE is a diagrammatic view showing the configuration of the planetary gearing in accordance with the invention.

DESCRIPTION OF THE PREFERRED EMBODMENT

As shown in the FIGURE, the free end of the stationary satellite carrier 2 is in the form of a flange bolted with screws directly to the top side of the tank or supporting bracket 1. The carrier may also be fastened in any other suitable manner, such as by clamping or welding. The stationary satellite carrier 2 is supported on the bearing 3 inside the housing 8. The bearing shaft can advantageously be extended to the outside to form a mixer shaft 4 or a general output shaft. The satellite gears 5 are in the form of double satellites each having two adjoining gear sections of different sizes on diametrically opposite sides of the sun gear. The satellite gear halves 6, which mesh with the sun gear, have larger diameters than the adjoining satellite gear halves 7, which mesh with inner teeth of the internal gear 8. The gear halves 6 are secured to and rotate with the respective gear halves 7.

The internal gear 8, which surrounds and encloses the entire gearing, is filled up to the level 9, indicated by the dashed line, with a lubricant which lubricates the internal parts of the planetary gearing. The second bearing 10 rotatably supporting internal gear 8, is located above the lubricant level 9 in a housing well 12, which is depressed relative to the upper edge 11 of the internal gear 8 and which is in the form of a labyrinth. Axially disposed through the center of the enclosed gearing is the sun gear shaft 13, which drives the sun gear 14. If the drive motor is directly coupled to the sun gear shaft 13, the mounting flange 15 serves as a supporting structure.

The operation of the planetary gearing is a follows: The sun gear shaft 13 drives the sun gear 14 meshing with the two diametrically opposed satellite gear halves 6, which in turn sets the revolving housing formed by internal gear 8 in motion via the other two satellite gear halves 7 which adjoin and rotate with gear halves 6.

The output is transmitted via the shaft 4 secured to internal gear housing; but may also be utilized directly by output elements flanged or otherwise suitably fastened to the housing. The inner part of the output shaft 4 is rotatably supported in the inner bearing 3. The second bearing 10 is positioned above the lubricant level 9 and thus does not come into contact with the transmission lubricant. In order to prevent the escape of the lubrication of the bearing 10 from the area of the transmission, the bearing 10 is disposed in a well 12 of the housing. The well is in the form of a labyrinth so that the lubricant of the upper bearing is positively prevented from escaping by both the force of gravity and centrifugal force. In addition, the well 12 and shape of revolving housing 8 also prevent the escape of particles which are caused by wear, such as possible, for example, if solid bearings are used. In this manner, a transmission with a large step-down ratio is obtained which is completely free of lubricant on the outside and can be used to advantage wherever complete absence of lubricant in the environment is required.

I claim:

1. Planetary gearing comprising: a stationary support, an outer housing rotatably suspended from said support, said housing including internal gear teeth and being adapted to contain a lubricant, said stationary support including an inner portion extending within said housing, a driving gear rotatably mounted within said inner stationary support portion and housing, satellite gear means rotatably mounted on said inner stationary support portion and coupling said driving gear with the internal gear teeth of said housing, a first bearing rotatably coupling said housing with said stationary support, said first bearing being enclosed within said housing above the level of lubricant to be contained in said housing, and a second bearing mounted on said inner stationary support enclosed within said housing, said housing including output coupling means rotatably mounted in said second bearing, said satellite gear means comprising a plurality of satellite gears including a pair of double satellite gears each having a larger diameter gear half meshing with said driving gear and a smaller diameter gear half rotatable with said larger diameter gear half and meshing with said internal gear teeth.

2. The planetary gearing of claim 1 wherein said first bearing is mounted within a well having walls forming a lubricant retaining labyrinth.

3. The planetary gearing of claim 1 wherein said stationary support includes a mounting flange on the upper end of said housing.

4. The planetary gearing of claim 1 wherein said outer housing completely encloses said driving and satellite gears and bearings and seals in said lubricant.

* * * * *